June 12, 1934.    J. F. GUTMANN    1,962,737
VEGETABLE CUTTER
Filed Jan. 17, 1933
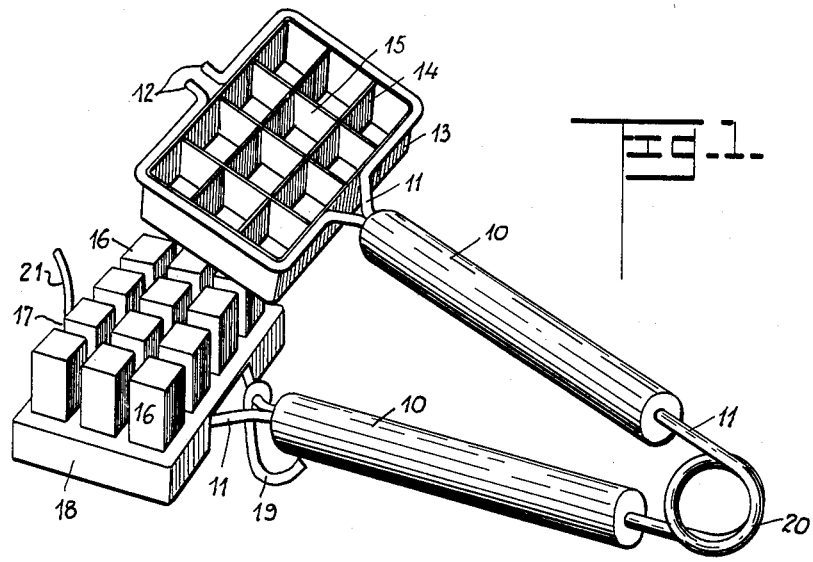
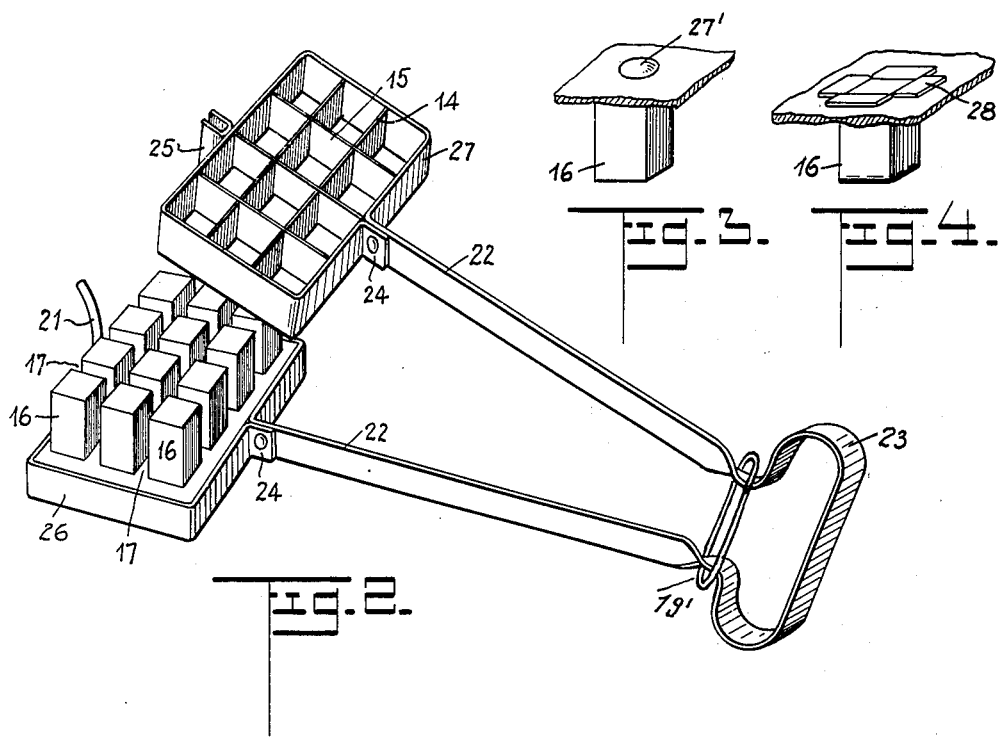
INVENTOR.
JOHN F. GUTMANN.
BY *Maxwell C. Sparrow*
ATTORNEY.

Patented June 12, 1934

1,962,737

UNITED STATES PATENT OFFICE 1,962,737

VEGETABLE CUTTER

John F. Gutmann, St. Albans, N. Y., assignor of forty-five per cent to Henry W. Mill, Bellaire, N. Y., and forty-five per cent to Henry Mill, Glendale, N. Y.

Application January 17, 1933, Serial No. 652,131

3 Claims. (Cl. 146—206)

My invention relates to kitchen utensils of the vegetable cutting class and particularly to certain new and useful improvements for the cutting of vegetables and the like, into squares or any other predetermined shapes.

The device is of a very simple and efficient construction and this invention has as an object the provision of a device which will avoid the present day cumbersome way of slicing and chopping vegetables and the like by knife in hand.

Another object of this invention is to produce uniform cuts such as squares, rounds, stars, rectangles, and etc., of vegetables and the like.

Another object of this invention is to accomplish the above with a device which is easily operated, cleaned and which can be easily stored away.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, a drawing depicting a preferred and a modified form have been annexed as a part of this disclosure, and in such drawing, like characters of reference denote corresponding parts throughout all the views, of which:

Fig. 1 is a perspective view of a device embodying and employing my invention.

Fig. 2 is a modified form thereof.

Fig. 3 is a detail of the solid type punch used in a form of the invention.

Fig. 4 is a detail of the hollow type punch used in another form of the invention.

In the drawing, the numeral 10 represents handles covering part of wire 11. Handles 10 may be made of wood, composite material such as bakelite etc. At one end the wire 11 is built to form a spring loop 20, while the other portion passes around the cutting devices or male and female parts of the die to be hereinafter explained. It is understood, that while wire 11 is shown as being in one piece, it is possible to make the cutting devices interchangeable. The ends of wire 11 are bent outwardly as shown at 12 so as to form a guide for spacer 21. The knife cutting or female die element consists of a frame 13, having located therewithin the cutting elements or dies 14 and 15 forming a grid. The punch element consists of a pan-shaped member or base 18 having riveted thereto punch or plunger members 16 made of any suitable material such as wood, metal, etc., which are located such as to provide for spaces 17 into which cutting members 14 and 15 enter when in compressed position. A hook 19 is provided for keeping the device in a closed position when not in use.

In the modification shown in Fig. 2, the handle 22, spring 23 and element frames 26, 27 are made in one piece, therefore, simplifying the construction. Guide member 25 in this case is a separate unit. After forming the required loop, the cutting member frames are riveted as shown at 24. Punch members 16 may be made of solid material, in which case riveting as shown at 27' will be the best construction. In case of hollow punch members 16 as shown in Fig. 4, the four lower edges will pass through slots in floor of frame 26 and then be turned over and soldered as shown at 28. A band 19' is adapted to be slid along the arms for keeping the device in a closed position when not in use.

It is understood, that any means may be applied which will secure the various parts, such as soldering, welding or riveting.

By omitting one set of cutting members—either the ones longitudinal or the latitudinal it will be possible to cut the material into strips. In this case the corresponding slots 17 will be omitted also.

The device is suitable for cutting vegetables, fruit, meats etc. such as celery, peppers, pickles, olives, onions, potatoes, carrots, beats, lettuce, schrimp, chicken meat, pimento's, apples, meats, cold slaw, peaches, pineapples, bananas, pears, tomatoes, cucumbers, bread, hard-boiled eggs, clams, and oysters. For illustration purposes, square cuts are shown, but any shape of cutters may be used, such as, round, oblong, diamond and etc. Pressing together of handles 10 or 22 respectively, after inserting material to be cut between the two members, is all that is to be done. Springs 20 or 23 will automatically open again the cutter, ready for the next piece. The device may be used also for chopping articles, such as spinach, by inserting the material in a bowl and continually opening and closing the cutter while inserted in the bowl amid the material.

Springs 20 and 23 at the end of the respective handles can also be utilized to hang the cutter up. It is understood that the cutting or die elements may be made removable.

The device hereindescribed is a great labor saving implement for use in homes, hotels, restaurants and the like, in the making of different salads, chowders and vegetables, soup etc.

It is believed from the above description that one will have no difficulty in understanding the construction, the method of use and operation of the device herein disclosed and a further detailed discussion thereof is unnecessary. The invention is of simple and practical construction and is adapted to accomplish among others, all of the objects and advantages herein set forth.

Without further analysis, the foregoing will so fully reveal the gist of this invention that others can by applying current knowledge readily adapt it for various applications without omitting certain features, that from the standpoint of the prior art, fairly constitute essential characteristics of the generic or specific aspects of this invention, and therefore, such adaptations should and are intended to be comprehended within the meaning and range of equivalency of the following claims:

1. A cutter device comprising a wire bent to form a spring loop and a pair of arms, cooperating cutting members, said arms terminating in portions passing around said members, respectively, a guide on one of said portions and a spacer on the other of said portions, the said guide being adapted to enter said spacer during operation of said device, one of said members comprising a frame and knife cutting elements located within said frame, the other of said members comprising a base and punch elements secured to said base, said punch elements being located such as to provide for spaces into which the cutting elements are adapted to enter when the device is in compressed position, and means for keeping the device in compressed position.

2. A cutter device comprising a wire bent to form a spring loop and a pair of arms, cooperating cutting members, said arms terminating in portions passing around said members, respectively, a guide on one of said portions and a spacer on the other of said portions, the said guide being adapted to enter said spacer during operation of said device, one of said members comprising a frame and knife cutting elements located within said frame, the other of said members comprising a base and punch elements secured to said base, said punch elements being located such as to provide for spaces into which the cutting elements are adapted to enter when the device is in compressed position.

3. A cutter device comprising a wire bent to form a spring end and a pair of arms, cooperating cutting members, extensions joining the said members respectively to said arms, a guide on one of said extensions, means on the other of said extensions adapted to receive said guide during operation of the device, one of said members comprising a frame and blade-like elements located within said frame, the other of said members comprising a base and punch elements on said base, said punch elements being located such as to provide for spaces into which the blade-like elements are adapted to enter when the device is in operation.

JOHN F. GUTMANN.